United States Patent Office

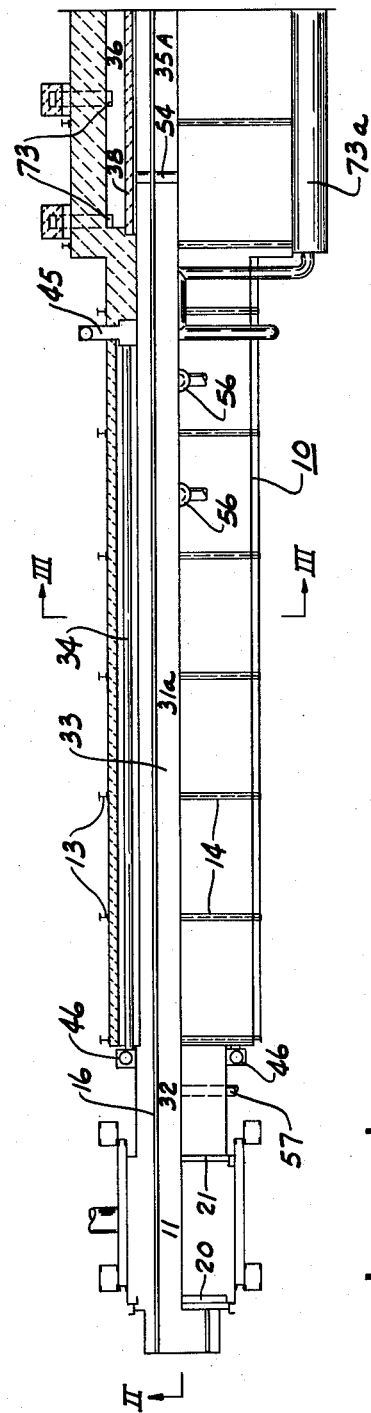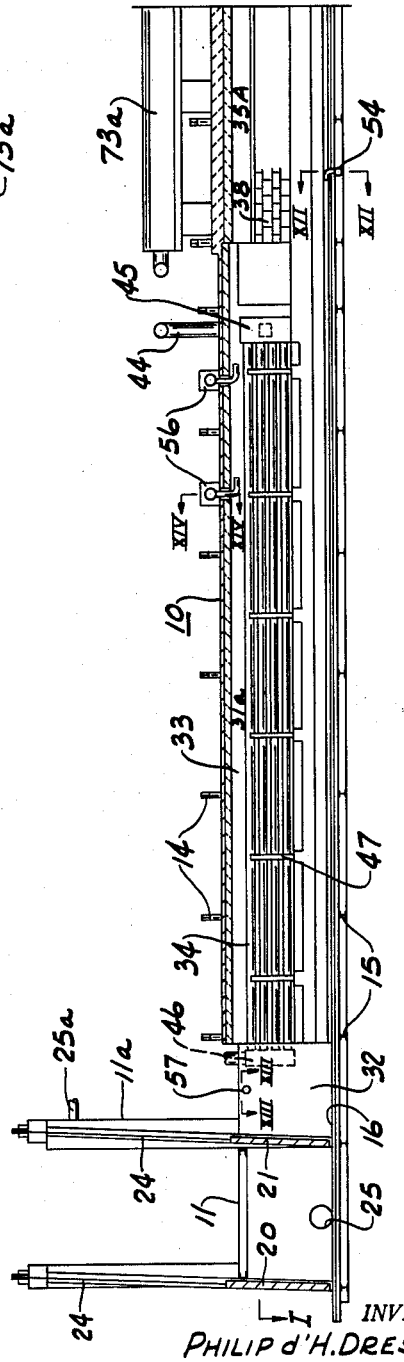

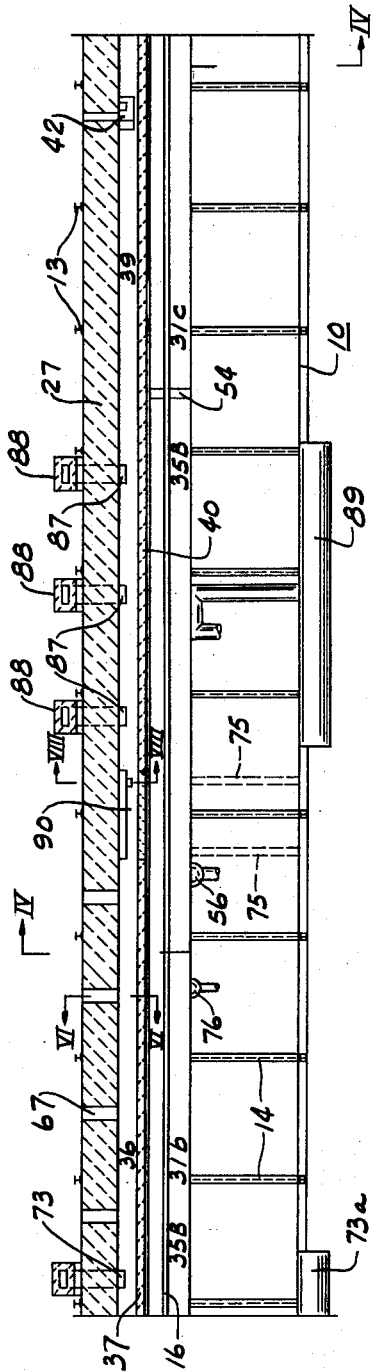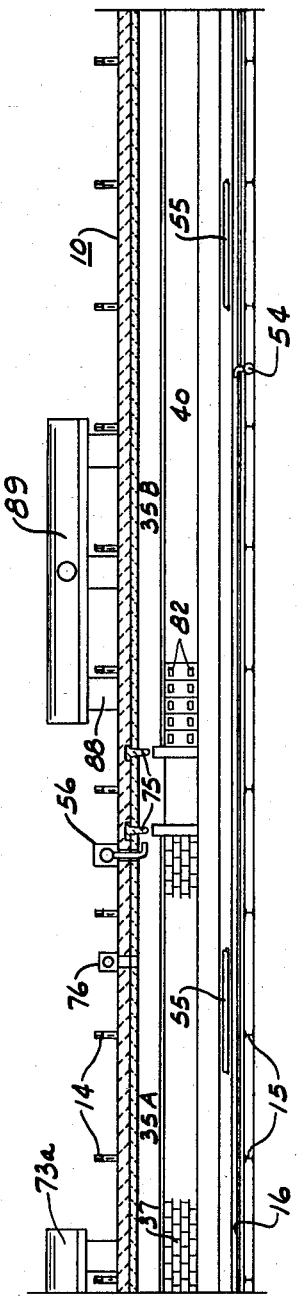

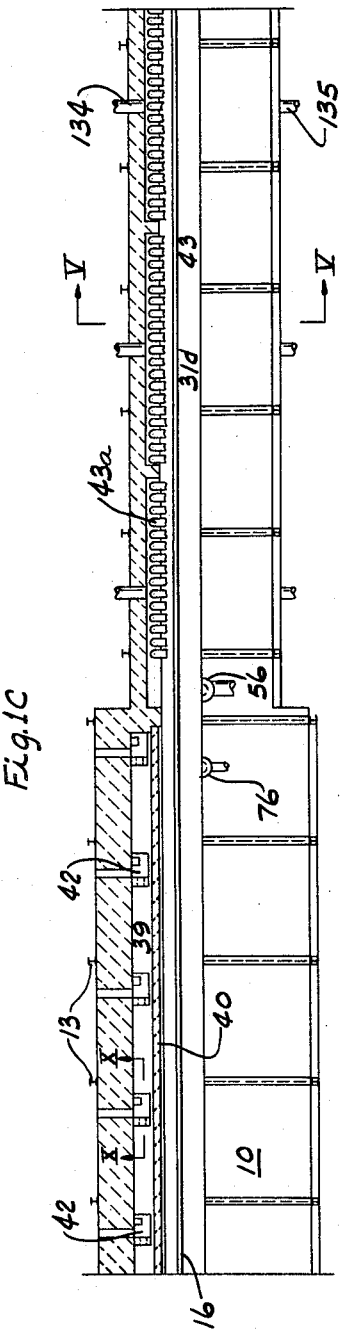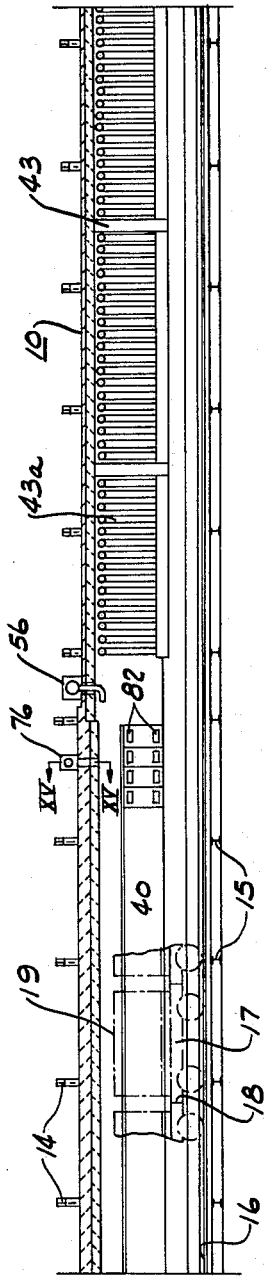

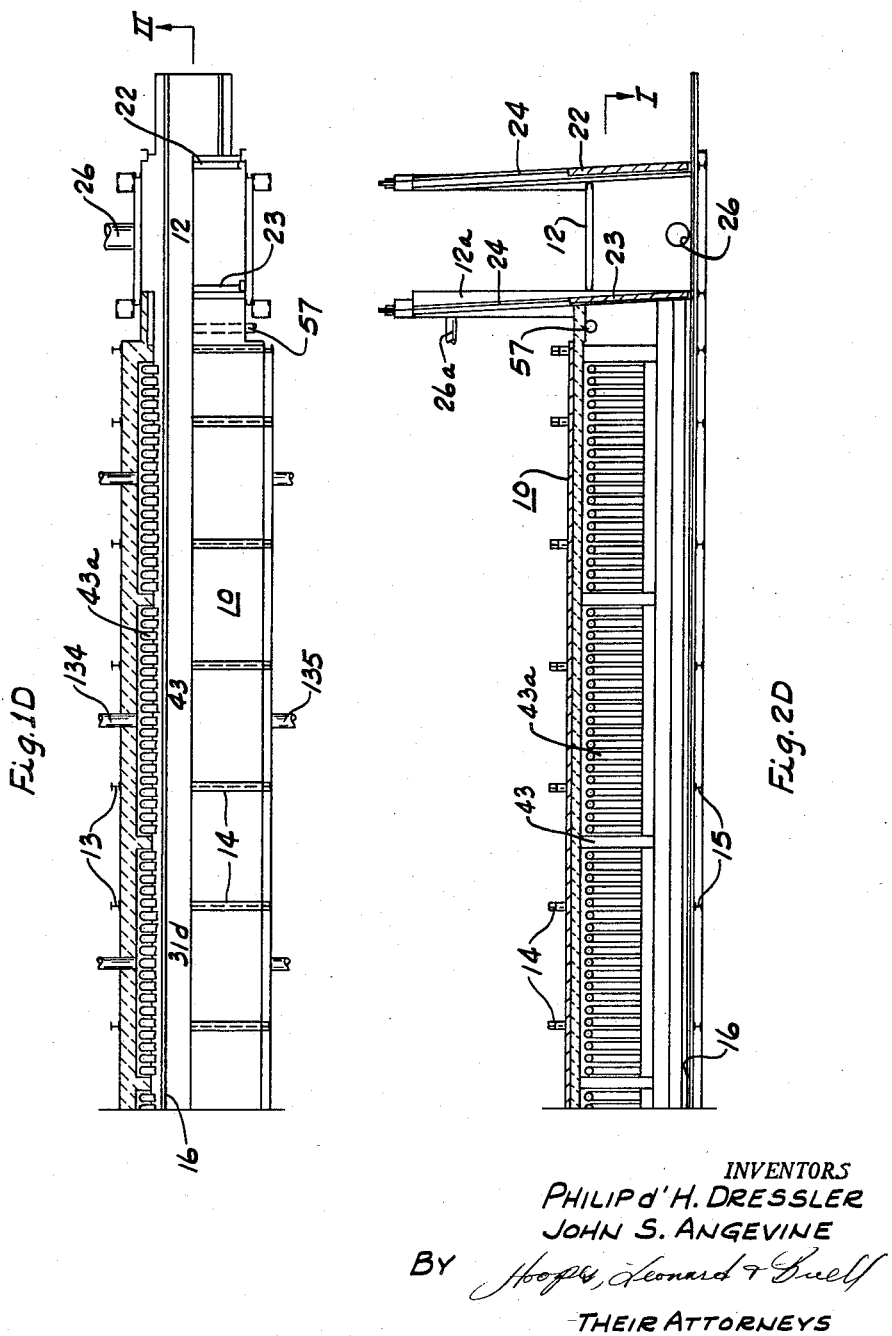

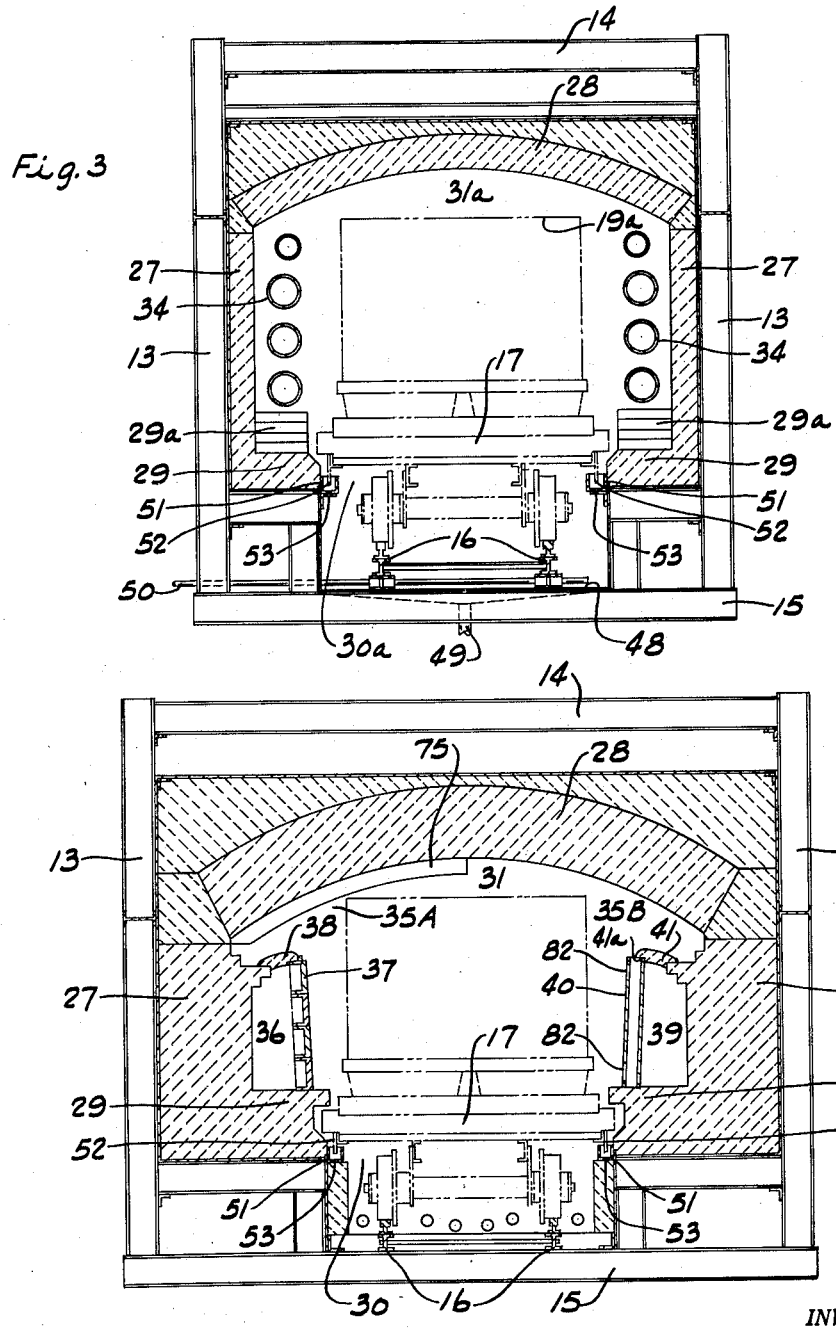

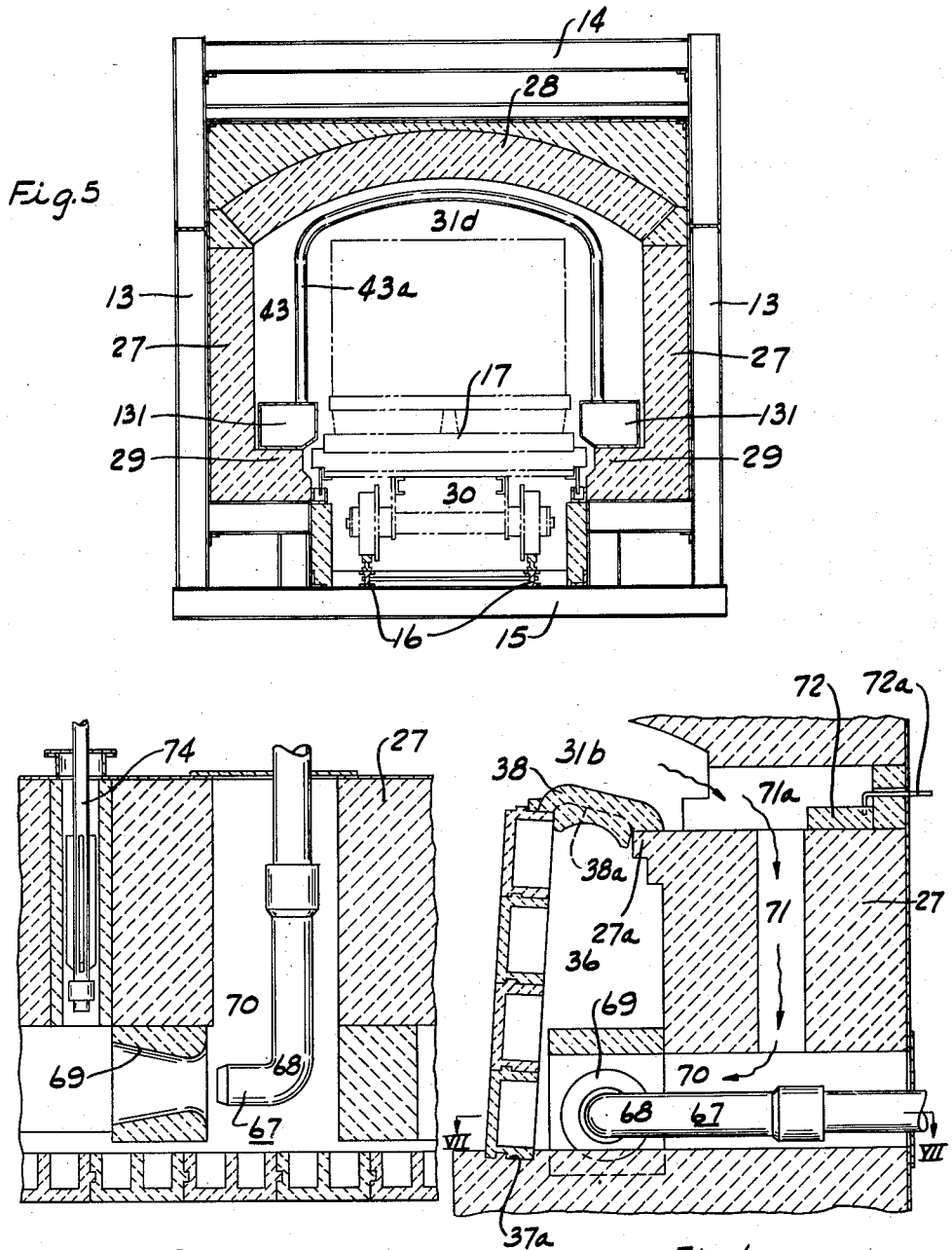

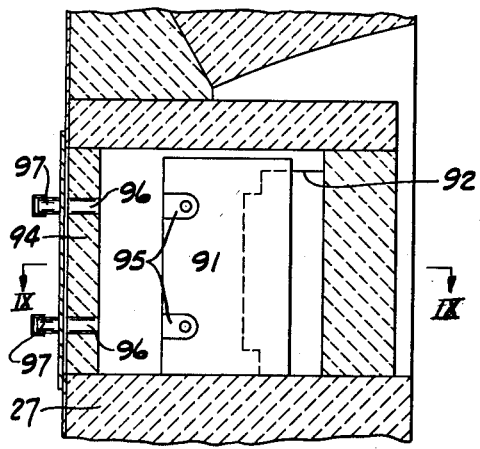
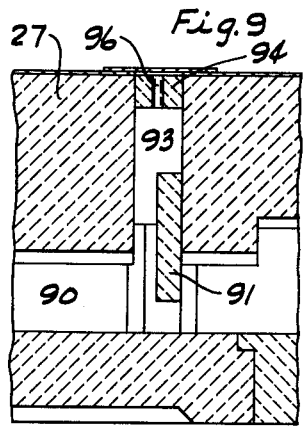
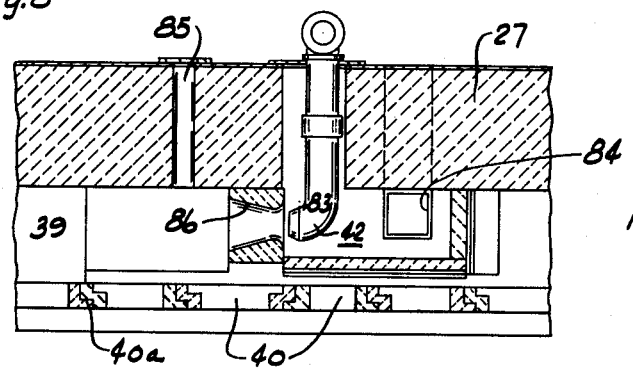
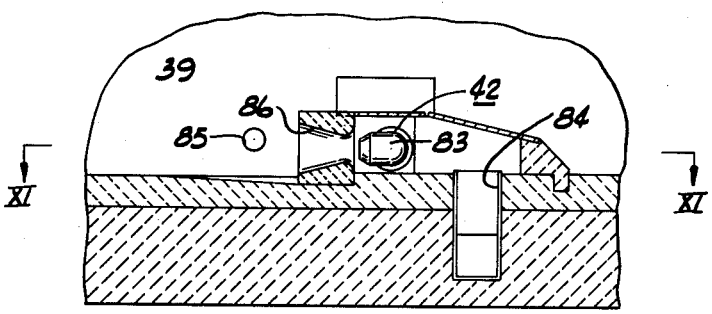

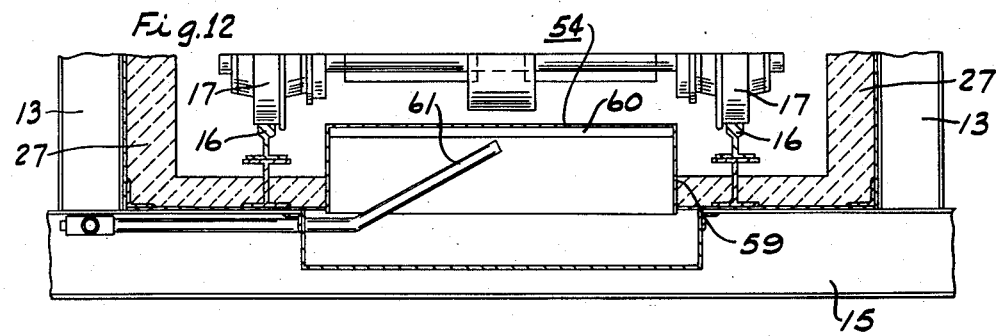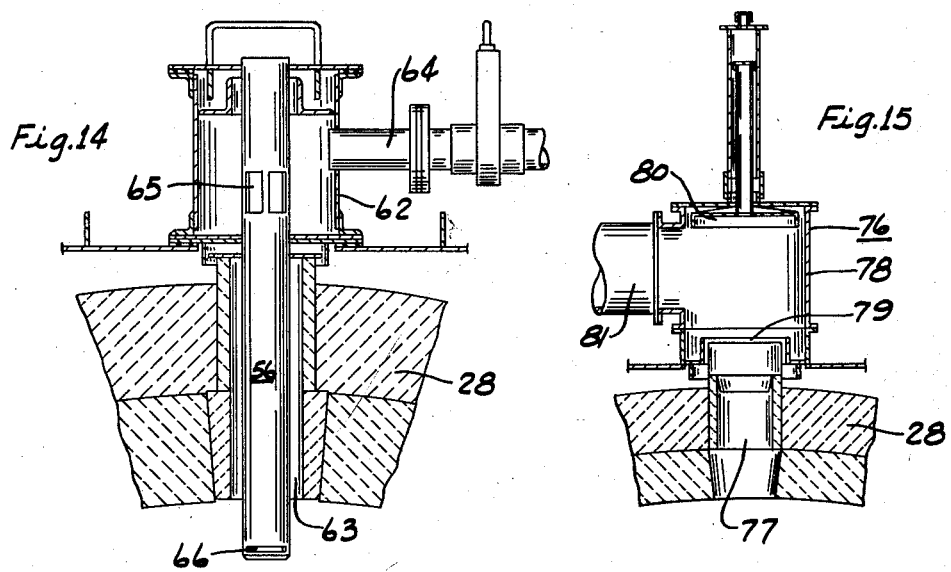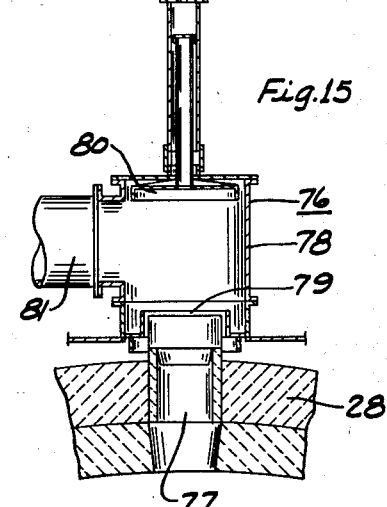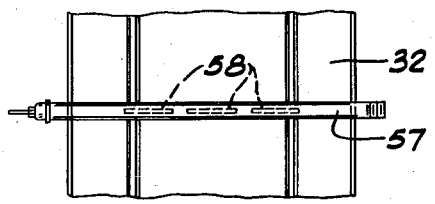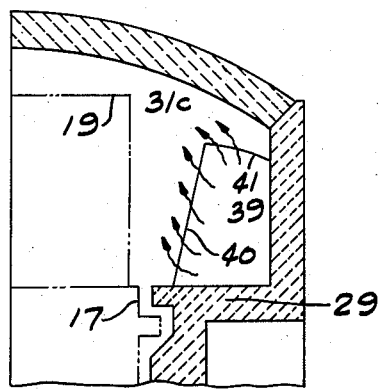

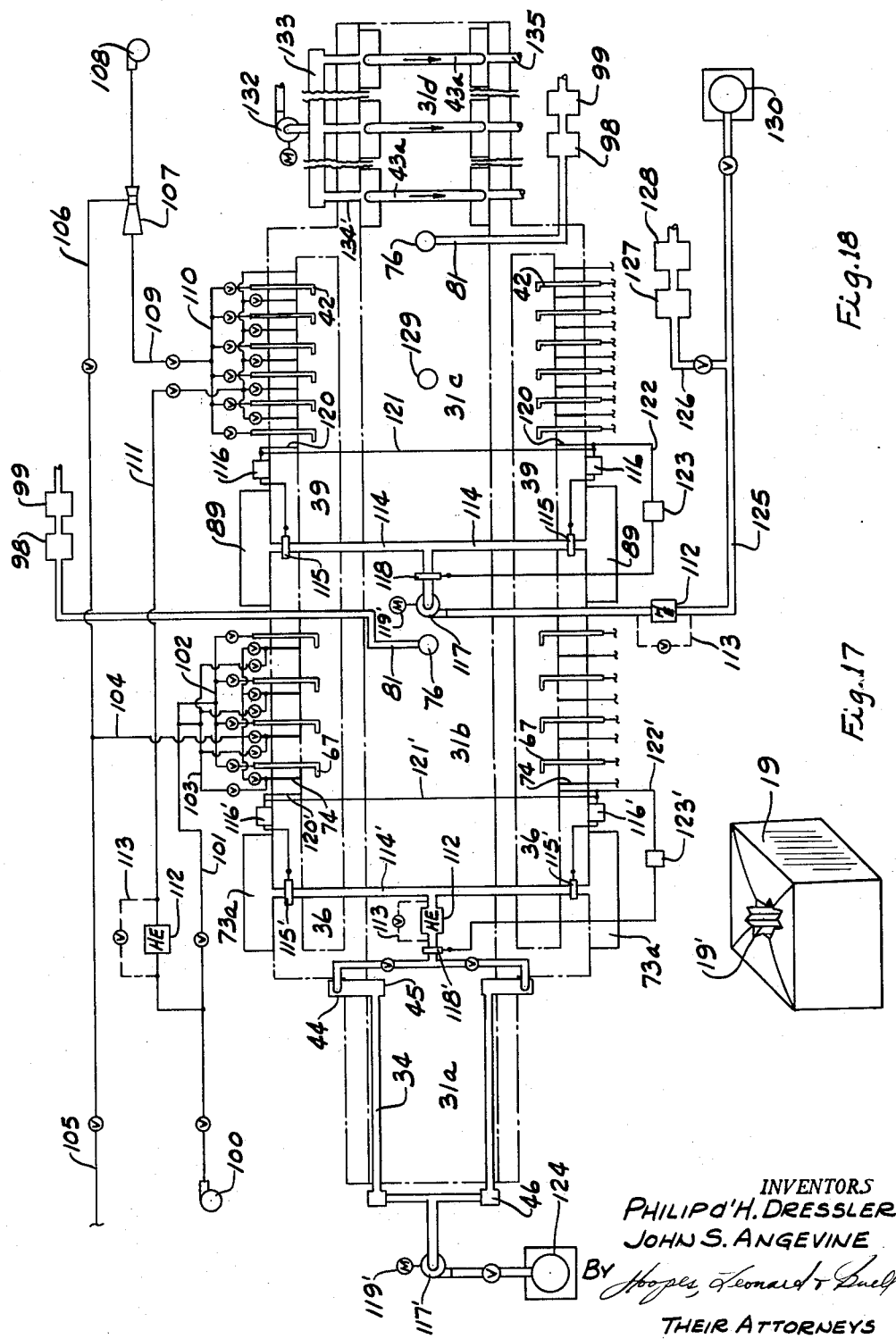

2,983,022
Patented May 9, 1961

2,983,022

APPARATUS FOR AND METHOD OF BAKING CARBONACEOUS PRODUCTS OR THE LIKE

Philip d'H. Dressler, Pittsburgh, Pa., and John S. Angevine, Newburgh, Ind.; said Dressler assignor to Swindell-Dressler Corporation, Pittsburgh, Pa., a corporation of Pennsylvania, and said Angevine assignor to Aluminum Company of America, Pittsburgh, Pa., a company of Pennsylvania Filed Feb. 28, 1958, Ser. No. 718,170

18 Claims. (Cl. 25—142)

This invention relates to a new system for baking carbonaceous products or the like. More especially, this invention pertains to a method and tunnel kiln or relatively continuously producing finished carbonaceous products, such as electrodes suitable for use in the production of aluminum, or other articles used for other purposes, without the use of saggers or containers.

Heretofore, carbon electrodes, for example, have been prepared as a practical matter by the mixing of calcined particles of petroleum coke or other carbon with a binder of pitch and then pressed into the shape desired for the electrode being made. Such molded green electrodes have then been placed in pit furnaces close to one another, and packed in and covered with coke. The electrodes were heated indirectly by conduction of heat from the furnace flues. The baked electrodes so produced varied somewhat in density from top to bottom and side to side. Those electrodes which were too soft or spongy had to be rejected. Acceptable electrodes, on the other hand, left the baking operation with a relatively rough dull surface which required expensive cleaning or grinding to make them smooth and to clean out the recess where the electrodes normally are attached to the conductor bar stub. Such batch-produced electrodes also varied from electrode to electrode in a particular batch and reproducibility by successive batches was substantially unpredictable. As for the electrode baking furnaces, they operated with high fuel and maintenance costs and the production therefrom was low in view of the long cycle required which might run as much as thirty days. In addition, the operation itself was one which was messy and produced a good deal of industrial dirt.

In the new system of this invention, relatively continuous production of various carbonaceous products, such as electrodes for the making of aluminum or the like, is obtainable on a cycle measured in a matter of a few days. The new system is noteworthy in that it makes the baking of such products possible, without the use of saggers, containers or other lateral supports and, further, provides a clean operation, both from the point of view of industry and the personnel employed therein. Such products and electrodes, moreover, are finished in that they require no cleaning or smoothing, have a metallic gray silvery appearance and are more uniform from top to bottom and from side to side. They reduce the likelihood of spalling or breaking off in use in the aluminum-making pot and have a more predictable life and functional character. In the new furnace means disclosed herein, provision is made to avoid untimely shutdowns due to tar or carbon deposits and gas flows are controlled to inhibit such deposits and transport of troublesome materials in the new furnace. Provision is also made for the obtaining of adequate supplies of non-combustion-supporting relatively clean gas where needed. The product passing through the new system is progressively heated for most effective baking and densification without disruption thereof or subjecting such product to detrimental oxidation. In product, process and apparatus, this invention has provided an extraordinary achievement in terms of increased quality, continuity, uniformity and speed of production.

Other objects, features and advantages of this invention will be apparent from the following description and the accompanying drawings, which are illustrative of one embodiment only, in which Figure 1, comprising parts 1A, 1B, 1C and 1D, shows one embodiment of this invention in plan with the right-hand portion thereof from the center in section taken along line I—I of Figure 2 and with the product conveyor removed;

Figure 2, comprising parts 2A, 2B, 2C and 2D, shows the embodiment illustrated in Figure 1 in elevation and in section taken along line II—II of Figure 1, with a few product conveyor cars schematically shown in the furnace zone;

Figure 3 is a cross section through the initial preheating zone taken along line III—III of Figure 1A;

Figure 4 is a cross section taken along staggered line IV—IV of Figure 1B;

Figure 5 is a cross section taken along line V—V of Figure 1C;

Figure 6 is a view in elevation taken along line VI—VI of Figure 1B;

Figure 7 is a view in section taken along line VII—VII of Figure 6;

Figure 8 is a view in elevation taken along line VIII—VIII of Figure 1B;

Figure 9 is a view taken along line IX—IX of Figure 8;

Figure 10 is a view in elevation taken along line X—X of Figure 1C;

Figure 11 is a view in section taken along line XI—XI of Figure 10;

Figure 12 is a partial view in elevation taken along line XII—XII of Figure 2A;

Figure 13 is a detail view in plan taken along line XIII—XIII of Figure 2A;

Figure 14 is a detail view in elevation taken along line XIV—XIV of Figure 2A;

Figure 15 is a detail view in elevation taken along line XV—XV of Figure 2C;

Figure 16 is a schematic view of the right-hand half of Figure 4 illustrating the regulated outward flow from the muffle combustion chamber to the nearby product space;

Figure 17 is a perspective view of one form of carbonaceous electrode which may be made by the new system of this invention; and Figure 18 is a schematic flow diagram for the illustrated embodiment.

Referring to the drawings, one embodiment for a practice of this invention is shown in the form of a tunnel kiln 10 having an entry vestibule 11 at the front thereof and an exit vestibule 12 at the back thereof. Steel girding for furnace 10 is provided in the form of vertical buckstays 13 and tieing roof girders 14 and floor girders 15. A track 16 extends longitudinally through furnace 10 for a conveyor in the form of cars 17 which roll on the track 16. The cars 17 have machined ends 18 to effect a virtual end to end closure between cars as one pushes the other through the kiln upon the introduction of fresh cars into the furnace proper rearwardly of the inner end of vestibule 11. Each freshly entering car will carry green electrodes 19a thereon without lateral support. Such electrodes may be a molded mixture of calcined carbon and binder pitch which are to be preheated, baked to become electrodes 19 and cooled as they, or other carbonaceous product, are moved step by step through furnace 10 in a relatively continuous finishing and industrially clean operation.

Furnace 10 is gas-tight and vestibule 11 is provided with an outer door 20 and an inner door 21, while vestibule 12 is provided with an outer door 22 and an inner door 23. These vestibule doors are operable manually, semi-automatically or automatically and in sequence so that when the outer door of each vestibule is open, the inner is closed and vice versa. Cables 24 operate the respective vestibule doors, the inner ones being within the closed superstructures 11a and 12a respectively. A purge atmosphere, which is non-combustion supporting, is supplied to each vestibule through the respective pipes 25 and 26 before communication is made between the respective vestibules and the interior of the furnace between them; the purge atmosphere exhausting in part at least through pipes 25a and 26a respectively.

The steel girding of furnace 10 binds the tunnel walls 27 and arch roof 28, of refractory. Each of those walls 27 is provided with a laterally and longitudinally extending bench 29 in each section of the furnace. The opposed benches 29 define a longitudinally extending undercar space 30 below the tops and between the inner sides thereof. A product space tunnel 31 extends lengthwise through furnace 10 inwardly of the vestibules above the tops of the benches 29 and is separated normally from the undercar space 30 by the presence of the cars 17 whose bodies continuously fill the length of furnace 10 from one inner door 21 to the other inner door 23 and the width between the benches. As each foremost car is separated and moved into vestibule 12 through door 23 while door 22 is closed a fresh car is moved rearwardly into insulated passage 32 at the beginning of furnace 10 proper.

As a car moves rearwardly through furnace 10 it passes first through a preheating zone 33 having longitudinally extending pipes 34 therein. Preliminary preheating of the product 19a takes place in zone 33 and lower boiling hydrocarbons or other volatiles may be driven off. In addition, atmosphere entering the product space portion 31a in zone 33 from other hotter zones in furnace 10 will be carrying condensible material therein generally of a tarry character. Quantities of those condensibles upon reaching relatively cooler zone 33 will condense and run down to the bottom of the conveyor zone 30 where they can be collected and removed.

In a second preheat zone 35A having a muffle 36 on each side, the product on the cars 17 is raised in temperature at a predetermined rate and removes further higher boiling volatiles. Continued rearward movement of a car will bring it alongside a furnace section 35B having a muffle 37 on each side with a hollow tile muffle wall 40 and cap 41. In the product space 31c in furnace section 35B, the temperature of the electrodes on the cars 17 is further raised until it reaches a maximum beginning about opposite the burners 42. That temperature may be maintained substantially until the cars 17 enter the product space 31d in the cooling section 43 with its cooling pipes 43a. In the cooling product space portion 31d, the product is reduced in temperature before it is passed into vestibule 12 and from thence into the outside air so that it will not burn in such air.

The preheat section 33 in the illustrated embodiment is lined on each side above the supports 29a on benches 29 by a series of spaced and supported horizontally extending preheating pipes 34. These preheating pipes receive effluent gas from the muffle chambers 36 through downcomers 44 and manifold boxes 45, such effluent gas flowing forwardly toward the front of furnace 10 and emptying into a discharge manifold 46 on each side. The pipes 34 are supported in part by racks 47 to either side of the product space 31a in section 33. Liquids in the section 33 run down into a metal trough 48 lining the bottom and sides of undercar space 30a in preheating zone 33. The bottom of trough 48 is sloped toward a sump outlet 49 from which the liquid is periodically removed. The tarry liquids may be kept relatively free flowing if needed by the use of a steam coil 50 placed in the bottom of the undercar space in that section.

A side trough 51 extends along the inner face of each bench 29 to overlap the lower edge of a seal plate 52 carried on each side of each car 17. In the preheating zone 33, the side troughs 51 begin a short distance after the beginning of the section itself. Such troughs 51 are empty in the preheating section 33 and are sealed by the run-off tar which drains into trough 48 from the troughs 51 through holes 53 in the bottom thereof. Thus, a seal between the undercar space and the space above the top of the benches 29 is established before any car has moved very far into preheat section 33 or furnace 10.

Intermingling of the atmosphere above the body of car 17 and the atmosphere in the undercar space 30 is further inhibited by the provision of nozzles 54, shown in detail in Figure 12, which discharge relatively cool, clean, non-combustion supporting gas toward the entrance end. Such not only keeps the undercar space throughout the furnace 10 relatively cool, but it also substantially inhibits such intermingling and circulation of product space atmosphere along the undercar space; and it further inhibits air infiltration into space 30 and furnace 10. As a consequence, the underbody of each car is kept relatively free from deposit of tarry materials as well as relatively cool. And, in the muffle preheating and heating zones 35A and 35B, longitudinally extending pipes 55 are provided through which cooling fluid like air is forced to assist in maintaining the undercar space cooler in those normally hotter sections of furnace 10.

A series of roof jets 56 for non-combustion supporting gas extending down through the crown of roof 28 in sections 33 and 35A are shown in illustrative detail in Figure 14 and fire toward the exit end of furnace 10. In so doing, those roof jets 56 in sections 33 and 35A minimize any tendency to set up a longitudinal circulation within the respective sections of a stratified nature along the underside of the roof crown. A like roof jet 56 adjacent the front of the cooling section 43 discharges non-combustion supporting gas toward the front end of furnace 10.

Admission of a combustion supporting gas like air in any material quantity into either end of furnace 10 is prevented not only by the double-doored vestibules 11 and 12 but also by the provision of curtain nozzles 57 which are shown in detail in Figure 13 and the positive pressure in the product space and undercar space. Such nozzles 57 have downwardly directed slots 58 through which non-combustion supporting gas in relatively clean condition is supplied. Such gas so supplied to the curtain nozzles 57 may come from an atmosphere generator such as those which make DX or other suitable atmosphere gas, or it may be non-combustion supporting gas taken from the interior of furnace 10 and cleaned before being recirculated to the curtain nozzles 57. The undercar nozzles 54 and the roof jets 56, as well as the purge gas pipes 25 and 26, may be similarly supplied from either source.

In connection with the pressure nozzles 54, they, as shown in Figure 12, may comprise a sheet metal plenum chamber 59 having a slotted orifice 60 extending across the width thereof and directed as aforesaid, appropriate gas being supplied to the interior of the plenum nozzle 59 by a supply pipe 61 at the selected pressure. Such pressurizing augments, as stated above, the seal between the plates 52 on each car and the side troughs 51. Such side troughs 51 in the respective preheating and furnace sections 35A and 35B preferably are filled with sand and have no holes through the bottom or sides thereof. In respect of the arch jets 56, such are supported in position by a fitting 62 closing a vertical opening 63 through the crown of roof 28 at each selected location. Fitting 62 receives the selected non-combustion supporting gas through a valved supply pipe 64 and such gas enters openings 65 in the top of jet nozzle 56 before issuing from the slotted arcuate orifice 66 at the bottom thereof, such orifice being oriented in the selected direction as aforesaid.

In preheating section 35A, the muffle wall 37 is built of suitable tile to provide a muffle heating zone 36 covered by a cap tile 38. The ends of longitudinally succeeding cap tiles 38 are provided with stepped portions 38a so that there are staggered interstices of a tortuous nature between such cap tiles like the interstices 40a in hollow tiles 40. Like interstices may be provided, if desired, between the tiles of wall 37. Such cap tiles rest on the top of wall 37 on the one side and on a ledge 27a on the other side. The bottom of the walls 37 is supported in an appropriate recess 37a in each of the benches 29. In the muffle preheating section 35A further volatile material is driven off of a tarry character which contaminates the atmosphere in product space 31b within that preheating section. In order to eliminate much tarry material as quickly as possible, section 35A is provided with a series of waste burners 67 shown in detail in Figures 6 and 7. Such burners 67 comprise a goose-neck member 68 extending through the walls 27 for that purpose. The members 68 discharge into a venturi block 69 and in so doing create a suction in the passage 70 and duct 71 which has an adjustable opening controlled by a duct damper 72. The upper end of duct 71 is in communication with a cross duct 71a which is open to product space 31b. Damper 72 is movable by a rod 72a so that it can be set to a preselected position. Thus, there is a lateral withdrawal to each side of the section 35A product space 31b of atmosphere containing the tarry volatiles to provide fuel for the operation of burners 67. Such firing taking place in muffle space 36 toward the front end of each thereof where offtake ducts 73 are located, such offtakes on each side terminating in an offtake drum 73a for further handling of such combusted material. A pilot burner 74 insures ignition of the combustibles issuing from each burner 67. Thereby, tarry materials which otherwise would deposit on the surfaces of the muffle 36 are quickly removed instead and burned.

The roof jet 56 in section 35A discharging as it does toward the exit end of that section inhibits longitudinal circulation and a tendency of tarry laden atmosphere from section 35A to drift or flow toward furnace section 35B in which the muffle and furnace surfaces are hotter with resulting greater detriment should tarry materials land thereon because of the cracking and harder carbon deposition that would be likely to result. Such movement of contaminated gases from section 35A toward section 35B is also impeded by the downwardly projecting roof baffles 75 which follow the crown line of roof 28 from one side of the interior of furnace 10 to the other.

Supplementary, or alternative, means for taking care of the tarry laden atmosphere in preheating section 35A are also shown in that such gases may if desired be withdrawn through a roof offtake 76 a detail of which is illustrated in Figure 15. A further such roof offtake for product space atmosphere withdrawal is provided in section 35B. Each such offtake has a central opening 77 at the very top of the crown of roof 28 which is closed by a fitting 78 which fitting's internal flange 79 fits around opening 77 so that a closure 80 may if desired slide in to seal the edges of flange 79. The internal fitting 78 is exhausted through a pipe 81 which normally would be under suction. The pressure in the product space 31 is normally maintained slightly above atmospheric pressure from one end of the furnace 10 to the other to prevent air infiltration.

In furnace section 35B, the sides of the product space 31c therein are bordered by the muffle chambers 39 respectively formed by the walls 27, benches 29, hollow tiles 40 and cap tiles 41. The bottoms of the hollow tiles 40 seat in appropriate recesses in the benches 29 and the cap tiles 41 like the cap tiles 38 are stepped at their ends to provide staggered or overlapping joints. At the same time, the cap tiles rest on the muffle chamber and furnace walls so that expansion and contraction are permitted to occur freely to the extent that they may take place. In constructing the walls of each muffle chamber 39, pieces of a material like cardboard may be inserted between the joints of the respective tiles so that when the furnace is dried out prepartory to use, such burnout or filler pieces will be consumed and provide staggered interstices through which gas may flow for a purpose which will hereinafter be described. The hollow wall tiles may be provided with upper and lower openings 82 on the outside thereof so that the space between the front and back walls of each tile 40 will act somewhat in the manner of a flue.

The muffle chambers 39 are heated by the burners 42 shown in more detail in Figures 10 and 11. Those burners comprise a gooseneck member 83 through which a rich fuel gas mixture may be supplied with insufficient air therein to be combustible. Secondary air for such combustion is supplied to the burners 42 through a duct 84 which, like the member 83, extends through the side wall of the furnace 10, such wall being closed around the respective member and duct. A sighting hole 85 may also be provided and normally closed on the outer end thereof adjacent each burner 42. The fuel discharged from the member 83 passes through a venturi block 86 and aspirates secondary air to combust the fuel and air in the muffle chambers 39. Each of the burners 42 may be provided with suitable valves on the fuel and air supply members to enable them to be individually regulated if and as desired. The regulation of such burners, further, is but one means for regulating the pressure in the respective muffle chambers 39.

At the forward end of the respective muffle chambers 39 there are ducts 87 leading to offtakes 88 which on each side terminate in an offtake drum 89. A reduced passage section 90 extends between the front end of the muffle chambers 39 and the rear end of the muffle chambers 36 in the illustrated embodiment, each said passage 90 being controlled by a sliding pressure regulating damper 91 controlling the opening 92 in passage 90. Damper 91 is movable in a recess 93, the outside of which is covered by an insulated cover 94 fastened to the steel shell of the furnace, such steel shell preferably covering all of the outside of the refractory and brickwork of furnace 10. The rear of the damper is provided with socket eyes 95 to be engaged by the hooked ends of rods passed through openings 96 when the caps 97 are removed therefrom so that the amount of opening 92 may be adjusted in accordance with the desired pressure relationship among the respective muffle chambers and the respective product space portions alongside and adjoining them in furnace 10. In some cases, damper 91 may be entirely closed, thereby making the muffle chambers in each of the respective furnace sections 35A and 35B in effect separate and independent muffle chambers.

The maintenance of electrodes 19 at maximum optimum temperature opposite the burners 42 in product space 31d of section 35B completes their discharge of volatile material and densification in the course of undergoing heating uniformly from top to bottom and side to side in the course of their progress through the furnace 10 and gives them a superlative and unique finish. Such heating is facilitated by mounting the electrodes on the cars 17 on mounts and so spaced that the atmosphere in the product space can circulate freely between the respective electrodes or stacks of electrodes, such heating taking place chiefly by convection and radiation with important increase in heating effectiveness over prior practices. Further, hydrocarbon and particulate material of a combustible nature which gets into the atmosphere in the product space 31c alongside the muffle chambers 39 is kept from detrimental adherence to the outer face of the muffle tiles by providing for a controlled combustion thereof in close proximity to such face. Thereby, the muffle walls of the chamber 39 are kept relatively clear of carbonaceous deposit for the transmission of heat therethrough and therefrom to the passing electrodes.

In the case of the muffle chambers 39, they are maintained at a pressure slightly positive relative to the pressure of the product space portion alongside. As a consequence, it is believed, without such belief being a limitation on this invention, that some combustible gases pass through the interstices 40a and through the interstices between the cap tiles 41 and burn as schematically illustrated in Figure 16 on the outer surfaces of the wall of muffle 39 in product space 31c and keep such surfaces relatively free of carbonaceous adhesion, deposit and buildup which otherwise would force unwanted shutdowns. Still further, the pressure relation between chamber 39 and product space 31c is maintained close enough that the gases passing out through the interstices, such as interstices 40a, do not impinge or reach the laterally adjacent electrodes 19 and thus avoid burning or making the surfaces of those electrodes relatively porous or spongy. At the same time, soot from cracking of hydrocarbons and particulate matter which is produced and in the atmosphere of product space 31c plus hydrogen therein from cracked hydrocarbons are urged to flow toward product space portion 31b in preheating section 35A by the arch jet 56 at the rear end of section 35B. Such inhibits the flow of soot in the atmosphere into the cooling section 43 where such soot would otherwise have a tendency to settle out on the cooling pipes 43a and lower their cooling efficiency. Reference has already been made to the supplementary, or alternative, functioning of the offtake 76 at the rear end of furnace section 35B.

In the case of muffle chambers 36, on the other hand, the pressure thereof is maintained somewhat lower relatively than the pressure in the laterally adjoining portion 31b of the product space. Thereby, flow will be toward the ducts 71 which supply the burners 67 with fuel in the form of the burnable contaminants and hydrogen in the tunnel atmosphere to prevent those contaminants from building up on the muffle walls or other parts of the furnace equipment, or both, to the detriment of the operation. The mantenance of that pressure relationship of the muffle chambers 36 is influenced by a variety of factors including the number of burners 67 placed in operation, the number of burners 42 placed in operation, the adjusted size of the openings 92, if left open, the amount of gas generated by the preheating and baking of the electrodes, the control regulation imposed upon the furnace 10, to mention some, although not all, of the factors which would be taken into account in heating up the apparatus for the first time preparatory to use. In the event that interstices are left between the tiles 37 and 38 in the muffle walls of the chambers 36, less dependence will have to be placed upon provision for ducts 71 and in some cases such ducts may be entirely omitted if there is sufficient such interstices area to bleed off contaminants with the atmosphere in product space 31b directly into the chamber 36.

In Figure 18, a schematic layout is shown of a flexible control system which may be impressed upon the illustrated furnace embodiment of this invention for the achievement of optimum results in the production of finished electrodes such as the one illustrated in Figure 17. In that schematic layout, each of the offtakes 76 is shown with its discharge pipe 81 conducting the gases respectively drawn off at the locations indicated to a cooler 98, which cooler may be a quick massive-volume oil quench to wet soot and other particulate matters therein and bring down the temperature thereof before the gases go to a cleaner 99. Normally, the gases coming from the forward offtake 76 at the rear end of the preheating section 35A will require somewhat less cooling but considerably more cleaning than the gases taken off through offstake 76 at the rear end of the furnace section 25B. Each cleaner 99 may be one of an electrostatic nature, such as the Cottrell type, and the effluent therefrom will be relatively clean, relatively cool and non-combustible gas which in either case may be supplied to one or more of the arch jets 56, the pressurizing nozzles 54, the curtain nozzles 57, or the purge pipes 25 and 26, depending upon the quantity and the relative need in a particular section or at a particular location in the equipment 10.

The burners 67 may be supplied with combustion air by a blower 100, such combustion air passing into the gooseneck members 68 through a pipe 101 and manifold 102. A manifold 103 connected to blower 100 may be used to supply combustion air to the pilot burners 74, the arrangement on each side being duplicated on the opposite side. Gas for the pilot burners is supplied to a manifold through a pipe 104 from a fuel gas source 105. That same source may be used to conduct fuel gas through a pipe 106 to the throat of a venturi inspirator 107 operated by a primary air blower 108, the fuel and primary partial combustion air passing through a pipe 109 to a manifold 110 and from thence to the gooseneck portions of the burner 42, the arrangement for which is duplicated again on the opposite side of furnace 10. Secondary combustion air for the burners 42 is supplied through a pipe 111 from blower source 100 preferably after indirect heat exchange at 112 with a hotter fluid body such as the combusted gases discharged from the drums 73a. The other heat exchangers shown on the diagram of Figure 18 are also marked 112 inasmuch as they too may draw upon such effluent gases from the drum 73a as their thermal head source before such gases are discharged to the stack, or the thermal head source may be the effluent gases from the drums 89 which otherwise might be sent to the stack dependent upon the needs of the system at the time being; e.g., the system will have more need of conserving heat in a colder weather season than it will in a warmer weather season. By-passes 113 may be provided around the respective heat exchangers.

For automatic regulation of the pressure in the muffle chambers, a control system may be employed and one form thereof is illustrated in Figure 18. For flexibility, such a control is applied to each of the muffle chamber systems being those respectively in the preheating section 35A and in the furnace section 35B. Thus, in the system for section 35B, pipes 114 are provided with motor control valves 115 respectively responsive to controllers 116 of a conventional type. The pipes 114 join and are placed under suction by a fan 117 which has a master motor operated valve 118 in the suction line therefor. Fan 117 is driven at a selected speed by a motor 119. If the conrtol 116 in the upper portion of Figure 18 is viewed as the dominant one to control the pressure in muffle 39 on that side through a pressure tap 120, that control will be set to provide that pressure. The opposite control 116 is connected to the first control 116 by a compensating line 121 which causes it to follow the dominant control 116 and correspondingly operate its respective valve 115. Both controls are tied through an impulse line 122 to a master control 123 for valve 118 with the result that if local regulation of the respective valves 115 by their respective controllers 116 is insufficient to provide the pressure inside the muffles 39, which will be the same in view of compensation line 121, at the preselected index pressure, then master control 123 will augment the local controls 116 and operate valve 118 to provide the additional regulation needed to achieve and maintain, automatically, the preselected pressure in muffle chambers 39. That preselected pressure may be absolute, or relative in terms of a differential pressure between the pressure inside the muffles 39 and the pressure in the adjoining product space 31c, as desired.

An independent but corresponding control to which the same reference numerals have been applied with the addition of a prime accent thereto is utilizable for control of the pressure relationship in the muffle chambers 36 as shown on Figure 18. Such independent control system for the preheating section muffles 36 also means that the two muffle chamber sets 36 and 39 may be operated independently as when the dampers 91 are fully closed on both sides of the furnace. In the case of the effluent gas from the drums 73a, generally there will be such a relatively high oxygen content therein as to make it undesirable for such gases to be cleaned and returned to the system. Such gases therefore, after being conducted through the preheating pipes 34, are drawn out by a fan 117' and sent to a chimney stack 124 for discharge. Whenever the product space atmosphere is drawn into the muffle chambers 36 in the preheating section 35A through the interstices of the muffle wall in significant quantity, a regular burner to which fuel is supplied in the regular manner may be utilized at the rear of each chamber instead of using aspirating burners 67 shown in the illustrated embodiment.

On the other hand, the muffle chamber effluent gas from drums 89 may be regulated by virtue of the feed to the burners 42 such that the combusted effluent is sufficiently non-oxidizing to warrant all or a portion thereof being taken out through a pipe 125 and a branch 126 for passage through a cooler 127 and a cleaner 128 which may be of a kind previously described in connection with the coolers and cleaners 98 and 99 respectively. If desired, a cooler or heat exchanger may also be inserted in the pipe between the drums 89 and the fan 117. Clean, cool non-combustion gas discharged from cleaner 128 may also be utilized to go to one or more of the purge inlets 25 and 26, the curtain nozzles 57, the undercar pressurizing nozzles 54, or the arch jets 56, or all of them, depending upon the supply available. When the gas from the drums 89 is not so diverted in whole or part, it may be discharged through a chimney stack 130. A pressure relief valve 129 may also be placed at the top of the crown of furnace 10 for safety or partial regulation purposes and, further, may be connected to an open air flare burner, if desired.

The finished product on the cars 17 leaving the furnace section 35B pass into a cooling section 43 having a plurality of transversely arching pipes 43a as shown in detail in Figure 5. The lower ends of the respective pipes are supported by and in communication with plenums 131 on the benches 29 on each side of the product space 31d. The cooling section is provided as a plurality of longitudinally succeeding subsections, each subsection having a pair of plenums 131 on opposite sides. A blower 132 is used to force air into a manifold 133 which is connected on one side of furnace 10 by the pipes 134 to the plenums 131 on that side. The air discharged from the exit ends of the pipes 43a into the discharge plenums 131 is exhausted through the respective pipes 135 to atmosphere or to stack 130 except to the extent that some of the discharge from subsections nearest to furnace sections 35B may be utilized, if desired, as a source of heated combustion air for the burners in one or more of the muffle chamber sections, as will be understood by those to whom this invention is disclosed. In the cooling section, the electrodes 19, or like product, are brought down to a safe temperature at which they will not burn when they move into the open air after passing through vestibule 12.

In a practice of this invention by means of an embodiment such as that illustrated in Figure 1, the product to be treated such as corbonaceous electrodes, may, as an illustration only, be gradually raised in temperature from 100° F. to about 450° F. in preheating section 33; further be gradually raised in temperature in preheating section 35A to about 1700° F.; and still further be gradually raised in temperature in furnace section 35B to about 2200° F. opposite the foremost of the burners 42 and there maintained at that temperature until the product enters cooling zone 43 wherein the finished product is gradually reduced in temperature to about 250° F. before the car 17 bearing it is separated in the purge vestibule 12 from whence it is taken into the air. The product baking cycle in the illustrated embodiment has the character of a continuous operation even though the conveyor, in the form of cars 17, are moved in this embodiment intermittently and is very short. Thus, the cycle time for a particular electrode from start to finish may be accomplished in a period varying according to the size and nature of the product and ranging from one day in some cases to a week in others.

The finished electrode product 19, one form of which is illustrated in Figure 17 with a recess 19' in the dome thereof, produced by this invention has a unique uniformity of composition and reproduciblity as well as a silvery metallic gray finish which requires no cleaning or grinding to fit it for use. Further, in use, product such as electrodes produced by this invention for a metal salt reducing bath such as an aluminum-making operation are less subject to spalling or other deterioration.

Various changes may be made in the details of the illustrated embodiment and practices and other embodiments may be provided without departing from the spirit of this invention, or the scope of the appended claims.

We claim:

1. In a closed tunnel kiln, apparatus comprising, in combination, enclosed entry and exit vestibule chambers, means for purging said first-named chambers, a longitudinal product chamber extending between said first-named chambers, means to inhibit access into said product chamber by outside air, a muffle chamber on each side of said product chamber, each of said muffle chambers having an inner wall made up of interfitting refractory sections, longitudinally close fitting cap members extending between said inner wall and the adjacent side of said kiln to close the top of said muffle chambers, a baffle projecting transversely into each of said muffle chambers to define an adjustable optional passage between a forward portion thereof and a rearward portion thereof, burners at least in said rearward portion, means to provide a preselected pressure in said rearward portion positive relative to the pressure in the laterally adjoining portion of said product chamber to force combusting gases from said rearward portion of said muffle chamber generally laterally to the outer face of the inner wall thereof to burn adjacent said face, means to provide a preselected pressure in said forward portion somewhat negative relative to the pressure in the laterally adjoining portion of the product chamber to draw product space atmosphere generally laterally into said forward portion of said muffle chambers, and means for withdrawing gases from said muffle chambers.

2. In a tunnel kiln, apparatus comprising, in combination, a longitudinal product chamber, a muffle chamber separated therefrom by a wall on each side of said product chamber, a damper projecting transversely into each of said muffle chambers to define an adjustable optional passage between a forward portion thereof and a rearward portion thereof, means to inhibit access into said product chamber at least adjacent said muffle chambers by outside air, burners at least in said rearward portion, means to provide a preselected pressure in said rearward portion positive relative to the pressure in the laterally adjoining portion of said product chamber to force combusting gases from said rearward portion of said muffle chamber in a generally lateral direction to the face of said wall in said product chamber, means to provide a preselected pressure in said forward portion somewhat negative relative to the pressure in the laterally adjoining portion of the product chamber to draw product space atmosphere into said forward portion of said muffle chamber, and means for withdrawing gases from said muffle chambers.

3. In a closed tunnel kiln, apparatus comprising, in combination, a longitudinal product chamber extending down the center of said kiln, a muffle chamber on each side of said product chamber, a longitudinal product conveyor extending substantially between the sides of said product chamber and adapted to move along said product chamber, said conveyor longitudinally dividing said product chamber into a product space and an underconveyor space, means for maintaining a selected pressure in said product space high enough to inhibit infiltration of air, means for providing a somewhat lower pressure in said underconveyor space, and means for providing predetermined pressure relationships in said muffle chambers relative to the pressure in said product space alongside said muffle chambers.

4. In a closed tunnel kiln, apparatus comprising, in combination, a longitudinal product chamber extending down the center of said kiln, means to inhibit access into said product chamber by outside air, forward and rearward muffle chambers on each side of said product chamber, means for keeping said muffle chambers on each side separated from one another, a longitudinal product rolling movement conveyor extending substantially between the sides of said product chamber, said conveyor longitudinally dividing said product chamber into a product space and an underconveyor space, mechanical seal means between said conveyor and said product chamber, said muffle chambers being alongside said product space, means for maintaining a positive pressure in said product space to inhibit infiltration of air, means for providing a somewhat lower pressure in said underconveyor space, means for regulating the pressure in said forward muffle chambers to a predetermined value somewhat below the pressure in that portion of said product space alongside said forward muffle chambers to withdraw atmosphere from said product space alongside said forward muffle chambers into said forward muffle chambers, means for regulating the pressure in said rearward muffle chambers to a predetermined value somewhat above the pressure in that portion of said product space alongside said rearward muffle chambers so that in the baking of carbon products or the like combusting gases from the interior of said rearward muffle chambers will be forced out and lick at the faces thereof in said product space alongside, and respective offtake means for said forward and rearward muffle chambers.

5. Apparatus for baking electrodes or the like, comprising, in combination, a longitudinally extending product chamber, means for substantially excluding combustion supporting gases from said product chamber, a bench extending longitudinally along each side thereof, a muffle chamber on each bench, a muffle wall separating each muffle chamber from said product chamber, said muffle wall being formed of interfitting refractory members with staggered interstices between the inside and outside thereof, means for combustion gases within each said muffle chamber, means for withdrawing combusted gases from each said muffle chamber, means for maintaining the pressure in said muffle chambers somewhat higher than the pressure in said product chamber to force a portion of the combusting gases therein to the respective faces of said member to burn carbonaceous material thereon and adjacent thereto without substantial impingement upon electrodes or the like in proximity to said muffle wall, a further muffle chamber on each bench forwardly of said respective first-named muffle chambers, said further muffle chambers being in communication with the product chamber alongside said further muffle chambers, means for maintaining the pressure in said further muffle chambers somewhat lower than the pressure in said product chamber to draw atmosphere from said product chamber into said further muffle chambers to be burned therein, and means for withdrawing combusted gases from said further muffle chamber.

6. Apparatus for baking electrodes or the like, comprising, in combination, a longitudinally extending product chamber, means for substantially excluding combustion supporting gases from said product chamber, a bench extending longitudinally along each side thereof, a muffle chamber on each bench, a muffle wall separating each muffle chamber from said product chamber, said muffle wall being formed of adjoining refractory members with interstices between the inside and outside of said wall, means for supplying and combusting gases within each said muffle chamber, means for withdrawing combusted gases from each said muffle chamber, and means for maintaining the pressure in said muffle chambers somewhat higher than the pressure in said product chamber alongside to force a portion of the combustion gases in said muffle chambers to the respective faces of said members through said interstices to burn carbonaceous material thereon and adjacent thereto without substantial impingement upon electrodes or the like in proximity to said muffle wall.

7. Apparatus for finishing carbonaceous articles, comprising, in combination, a longitudinally extending refractory tunnel, longitudinally extending benches on each side of said tunnel, said benches defining an undercar space in the area between them and a product space in the area above them, means for discharging gas under pressure longitudinally in said undercar space to inhibit entry of product space atmosphere thereinto, forward and rear muffle chambers on said benches on each side of said tunnel, said muffle chambers having heat radiating walls facing the product space and respective passage means at least to said forward muffle chambers communicating with said product space, means for regulating the interior pressure of said forward muffle chambers to maintain it slightly less than the pressure in said product space to withdraw product space atmosphere through said passage means, means for regulating the pressure inside said rear muffle chambers to maintain it slightly greater than the pressure in said product space, means for maintaining the relation between the respective pressures in said front and rear muffle chambers, and means for substantially excluding combustion supporting gas from said tunnel outside of said muffle chambers.

8. Apparatus for baking carbonaceous products, comprising, in combination, a longitudinally extending refractory tunnel, a product space extending longitudinally and centrally through said tunnel, curtain members for discharging non-combustion supporting gas into said product space adjacent the ends of said kiln to exclude air from the interior of said tunnel, at least a pair of succeeding muffle chambers extending on the respective sides of said tunnel, said muffle chambers being separated from said product space by heat radiating walls, said rearward muffle chambers having staggered interstices connecting the interiors of said muffle chambers with said product space, the respective muffle chambers on each side having a connecting passage, an adjustable damper for said passage, a plurality of burners in the rearward muffle chamber on each side, means for supplying fuel and combustion air to said burners, at least one burner in each forward muffle chamber on each side and to the rear of said forward muffle chamber, a duct connecting each of said forward muffle chambers with said product space to withdraw atmosphere therefrom with combustibles therein to be burned in said last-mentioned burners, said duct having an adjustable opening connecting the same with said product space.

9. In a closed tunnel kiln for baking electrodes or the like, apparatus comprising, in combination, an entry vestibule having outer and inner doors, an exit vestibule having outer and inner doors, an enclosed product chamber extending in a straight line between the inner doors of said respective vestibules, means to inhibit access into said product chamber by outside air, a preheating pipe section adjacent said entry vestibule, said preheating pipe section having a longitudinally extending trough along the bottom thereof for liquids draining thereinto, superposed preheating pipe extending longitudinally on each side of said preheating pipe section to conduct combusted gases forwardly through said pipes, a preheating muffle section adjoining said preheating pipe section to the rear thereof, a preheating muffle chamber in said preheating muffle section on each side of said product chamber, each of said muffle chambers having an upstanding refractory wall to preheat indirectly product in said product chamber, a burner in each of said muffle chambers, means to draw product chamber atmosphere into each of said preheating muffle chambers, offtake means connecting said muffle chambers to said preheating pipes, a heating section adjoining said preheating muffle section to the rear thereof, a muffle chamber in said heating section on each side of said product chamber, said second-named muffle chambers being in communication with said first-named muffle chambers through an adjustable optional passage, each of said second-named muffle chambers having an upstanding refractory wall to heat indirectly product in said product chamber, means including a damper movable transversely to regulate the size of said passage to selectively maintain said second-named muffle chambers somewhat positive in pressure relative to the pressure in said product chamber and to maintain said first-named muffle chambers somewhat negative relative to the pressure in said product chamber, means to permit combustible gases from said second-named muffle chambers to pass through the walls thereof into said product chamber to burn close to said walls, and a cooling section extending rearwardly of said heating section substantially to said exit vestibule.

10. In a closed tunnel kiln for carbonaceous electrodes or the like as set forth in claim 9, said cooling section having cooling pipes arching across the top of the product chamber in said cooling section and extending downwardly along the respective sides thereof, plenums connecting the lower ends of groups of adjacent cooling pipes, means for circulating cooling fluid through said pipes, means for withdrawing non-combustion supporting gases from said kiln, means for cooling and cleaning said last-mentioned gases, and means for returning such cleaned gases to said kiln.

11. Apparatus for heat treating carbonaceous products or the like, comprising, in combination, a longitudinally extending refractory tunnel defining a space through which product is moved, an indirect lower temperature preheating section in the forepart of said tunnel, a higher temperature muffle section behind said preheating section, a still higher temperature muffle section behind said higher temperature muffle section, a cooling section behind said still higher temperature muffle section, means for independently regulating the muffle pressure in said muffle sections relative to the pressure in said product space, means for regulating communication between the muffles in said respective muffle sections and said product space to at least withdraw product space atmosphere from said product space through the interior of a muffle section by said communication, means for conducting a predetermined volume of gases discharged from said higher temperature muffle section into said preheating section, offtake means for remaining such gases, means for passing a fluid coolant through said cooling section, means for substantially excluding combustion-supporting gases from said product space, and means for withdrawing non-combustion supporting atmosphere from said product space for cleaning and recirculation thereto.

12. Apparatus for heat treating carbonaceous products or the like, comprising, in combination, a longitudinally extending refractory tunnel defining a space through which product is moved, means to inhibit access into said tunnel by outside air, atmosphere locks at the ends of said tunnel, means for admitting non-combustion supporting purge gases into said atmosphere locks, an indirect lower temperature preheating section in the forepart of said tunnel, means for condensing, collecting and withdrawing material in said lower temperature preheating section, a higher temperature preheating muffle section behind said first-named preheating section, means for withdrawing atmosphere from said product space into the interior of said higher temperature muffle section to be burned therein, a still higher temperature muffle section behind said higher temperature preheating muffle section, means for bleeding a portion of the combustible gases in said still higher temperature muffle section into said product space adjacent said last-named muffle section respectively, a cooling section behind said still higher temperature muffle section, means for passing a fluid coolant through said cooling section, means for substantially excluding combustion-supporting gases from said product space, and means for withdrawing atmosphere from said product space for cleaning and recirculation thereto.

13. Apparatus as set forth in claim 12, having means for longitudinally discharging non-combustion supporting gases adjacent the underside of the top of said tunnel to inhibit longitudinal circulation of atmosphere in said product space between said sections respectively.

14. In a method for preparing carbonaceous products such as electrodes or the like, steps comprising, in combination, conveying molded self-supporting unbaked product on a conveyor with said products moving through a product zone and said conveyor moving through a conveyor zone, supplying a non-combustion supporting atmosphere to said product zone at a pressure somewhat above atmospheric, at least part of said first-named supplying being directed toward the discharge end of said product zone, substantially sealing off said product zone from said conveyor zone, supplying a non-combustion supporting atmosphere to said conveyor zone at a pressure slightly below the pressure in said product zone, said second-named supplying being directed toward the entrance end of said conveyor zone, providing a preliminary preheating zone along the path of said conveying of said product in said product zone, condensing condensibles from the atmosphere in that portion of said product zone alongside said preliminary preheating zone, collecting condensibles so condensed and other liquids present in said preliminary preheating zone in the bottom of said conveyor zone for withdrawal of such liquids therefrom, providing a muffle preheating zone alongside the path of said conveying of said product in said product zone, said muffle preheating zone being positioned rearwardly of said preliminary preheating zone, regulating the pressure inside said muffle preheating zone to withdraw atmosphere from said product zone to burn in said muffle preheating zone, discharging gases from said muffle preheating zone to said preliminary preheating zone to act as the preheating source therein, providing a muffle heating zone alongside the path of said conveying of said product in said product zone, said muffle heating zone being positioned rearwardly of said muffle preheating zone, regulating the pressure in said muffle heating zone to bleed combusting gases through the boundary of said muffle heating zone into said product zone closely adjacent only to said boundary of said muffle heating zone, withdrawing non-combustion supporting gases from at least one of said zones, cleaning said non-combustion supporting gases so withdrawn, recirculating at least part of said non-combustion supporting gases so withdrawn and cleaned to at least one of said zones, providing an indirect cooling zone around the path of said conveying of said product in said product zone, said cooling zone being positioned rearwardly of said muffle heating zone, and supplying a cooling fluid to the interior of said cooling zone to reduce the temperature of said product below the flammable temperature thereof in air.

15. In a method for preparing carbonaceous products or the like, steps comprising, in combination, conveying molded laterally self-supporting unbaked product on a conveyor with said products moving through a product zone and said conveyor moving through a conveyor zone, supplying a non-combustion supporting atmosphere to said product zone at a pressure somewhat above atmospheric, supplying a non-combustion supporting atmosphere to said conveyor zone at a pressure slightly above atmospheric, providing a muffle preheating zone alongside the path of said conveying of said product in said product zone, regulating the pressure inside said muffle preheating zone to withdraw atmosphere from said product zone to burn in said muffle preheating zone, providing a muffle heating zone alongside the path of said conveying of said product in said product zone, said muffle heating zone being positioned rearwardly of said muffle preheating zone, regulating the pressure in said muffle heating zone to bleed combusting gases generally laterally into said product zone to burn closely adjacent only to said muffle heating zone, discharging non-combustion supporting gases into respective portions of said product zone alongside said muffle zones in selected directions and adjacent the top of said portions to inhibit longitudinal circulation between said muffle zones, withdrawing non-combustion supporting gases from at least one of said zones, cleaning said non-combustion supporting gases so withdrawn, recirculating at least part of said non-combustion supporting gases so withdrawn and cleaned to at least one of said zones, and cooling said product in said product zone rearwardly of said muffle heating zone to reduce the temperature of said product below the flammable temperature thereof in air.

16. In a muffle combustion method for preparing carbonaceous products or the like, steps comprising, in combination, conveying product through an enclosed product space, supplying a non-combustion supporting atmosphere to said product space at a pressure above atmospheric, providing a muffle preheating zone alongside the path of said conveying of said product in said product space, regulating the pressure inside said muffle preheating zone to withdraw atmosphere from said product space to burn proximately in said muffle preheating zone, providing a muffle heating zone alongside the path of said conveying of said product in said product space, said muffle heating zone being positioned rearwardly of said muffle preheating zone, and regulating the pressure in said muffle heating zone to force combusting gases in restricted quantity into said product space to burn closely adjacent to said muffle heating zone.

17. In a muffle combustion method for preparing carbonaceous products or the like, steps comprising, in combination, moving product through an enclosed product space, supplying a non-combustion supporting atmosphere to said product space, providing a muffle heating zone alongside the path of said conveying of said product in said product space, and regulating the pressure in said muffle heating zone to force combustion gases in restricted quantity into said product space to burn closely adjacent to said muffle heating zone.

18. In a muffle combustion method for preparing carbonaceous products or the like, steps comprising, in combination, conveying product through an enclosed product space, supplying a non-combustion supporting atmosphere to said product space at a pressure above atmospheric, providing a muffle zone alongside the path of said conveying of said product in said product space, regulating the pressure inside said muffle zone to withdraw atmosphere from said product space to burn proximately in said muffle zone.

References Cited in the file of this patent

UNITED STATES PATENTS

| | | |
|---|---|---|
| 1,556,208 | Dressler | Oct. 6, 1925 |
| 1,867,318 | Hull | July 12, 1932 |
| 1,875,365 | Begeman | Sept. 6, 1932 |
| 2,039,445 | Parmelee | May 5, 1936 |
| 2,081,954 | Phillips | June 1, 1937 |
| 2,117,994 | Robson et al. | May 17, 1938 |
| 2,376,760 | Elsey | May 22, 1945 |
| 2,567,556 | Dressler et al. | Sept. 11, 1951 |

UNITED STATES PATENT OFFICE
CERTIFICATE OF CORRECTION

Patent No. 2,983,022            May 9, 1961

Philip d'H. Dressler et al.

It is hereby certified that error appears in the above numbered patent requiring correction and that the said Letters Patent should read as corrected below.

Column 1, line 17, for "or" read -- for --; column 8, line 3, for "25B" read -- 35B --; line 55, for "conrtol" read -- control --; column 9, lines 59 and 60, for "sections" read -- section --; line 70, for "corbonaceous" read -- carbonaceous --; column 11, line 57, column 12, line 17, and column 16, line 18, for "combustion", each occurrence, read -- combusting --.

Signed and sealed this 17th day of October 1961.

(SEAL)
Attest:

ERNEST W. SWIDER            DAVID L. LADD
Attesting Officer            Commissioner of Patents